March 17, 1936.                 P. SCHNEIDER                 2,034,251
                                AUTOMOBILE TENT
                              Filed Nov. 3, 1934

INVENTOR
Paul Schneider
By Jas R Snyder
Attorney

Patented Mar. 17, 1936

2,034,251

UNITED STATES PATENT OFFICE 2,034,251

AUTOMOBILE TENT

Paul Schneider, Pittsburgh, Pa.

Application November 3, 1934, Serial No. 751,344

1 Claim. (Cl. 135—1)

My invention relates to an automobile tent, and the primary object thereof is to provide a tent of the character described, which is preferably employed in combination with a four-door sedan type of motor vehicle, to convert the latter into a shelter particularly adapted for sleeping quarters for camping tourists.

Further objects of the invention are to provide a device of the class stated, which is simple in its construction and arrangement, which may be readily erected and dismantled, and compactly collapsible for storage and transportation, and which is comparatively inexpensive to manufacture.

With the foregoing and other objects in view which will appear as the description proceeds, the invention consists of the novel construction, combination and arrangement of parts herein specifically illustrated and described, but it is to be understood that changes in the form, proportions and details of construction may be resorted to that come within the scope of the claim hereunto appended.

In the drawing wherein like numerals of reference designate corresponding parts throughout the several views.

Figure 1:
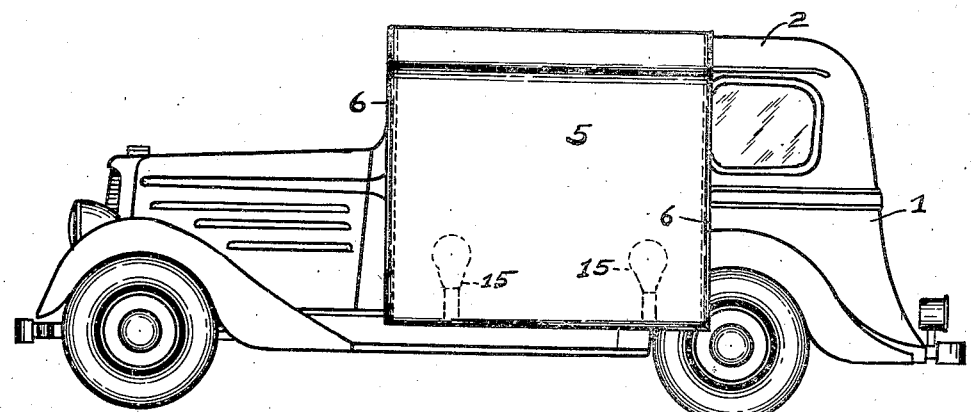
Figures 1 and 2 are, respectively, side and front views of a motor vehicle embodying the present invention.
Figure 2:
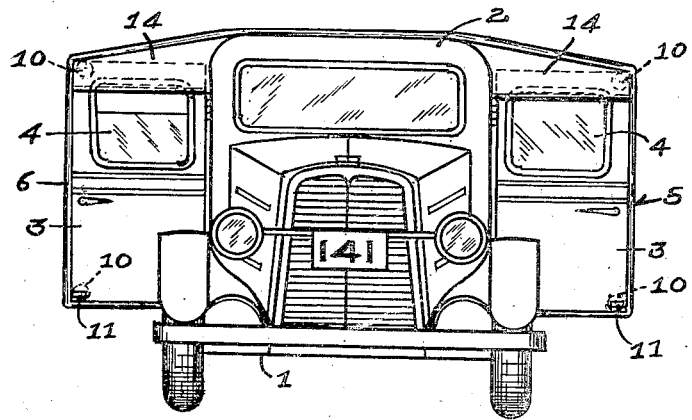
Figure 3:
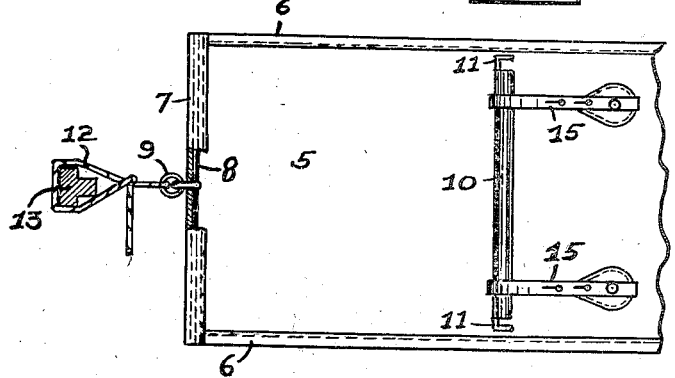
Figure 3 is a fragmentary front view of the inner side of the tent structure with associated parts.

Referring in detail to the drawing, the numeral 1 denotes a four-door type of automobile of the usual construction, including a top 2, and the doors 3 provided with windows 4.

The present invention comprises a sheet tent 5, which consists of a rectangularly-shaped fabric sheet constructed from canvas or any other suitable analogous material, and being of a greater length than width. The side and end edges of the sheet tent are preferably reenforced by hems, respectively indicated at 6 and 7. Each end of the sheet tent is further reenforced by rigid rods 8 inserted in the hems 7. A connecting ring 9 is attached to the center of the rod 8 and prevents the longitudinal movement of the latter in the end hem.

In erecting the sheet tent 5, all four doors 3 of the automobile are shifted to the open position to extend at right angles relatively to the longitudinal disposition of the vehicle. The doors are held in such open position by a plurality of longitudinally extending holding bars 10 provided with end clips 11, which engage the edges of the doors. A holding bar 10 is positioned between and engages the upper corners and another the lower corners of each pair of adjacent doors standing open at each side of the motor vehicle.

The sheet tent 5 is positioned to extend longitudinally across the vehicle top 2, and engages the top edges, the outer side edges and the lower edges of all of the open vehicle doors 3. Each of the holding bars 10 is suspended in a pair of adjustable loops 15, which are attached to the inner side of the sheet tent at positions to locate and hold the holding bars at respective upper and lower corners of the vehicle doors.

The sheet tent 5 is drawn taut across the vehicle top and along the door edges by a pair of ropes 12. One end of the latter is attached to the connecting ring 9 and the other end thereof is secured around the usual center post 13 of the vehicle disposed between each pair of adjacent doors 3.

The sheet tent 5 is provided with drops or flaps 14 for covering the open space occurring between the former and the top edge of each of the doors 3, owing to the variation in the height of the latter relatively to the vehicle top 2. The variation in the relative elevations of the doors and vehicle top provides a desired sloping top to the erected sheet tent for shedding rain therefrom.

While illustrating and describing the use of both pair of doors at respective sides of the motor vehicle in combination with my improved sheet tent, it will here be noted that the latter may be employed when utilizing only one pair of adjacent doors. When so used, the upper holding bar 10, carried at the unused side of the sheet tent, may be conveniently secured to the handles of the closed doors by a suitable flexible member or in any other suitable manner to meet conditions found in practice. Further, it is obvious that the ropes 12 may be secured to stakes driven in the ground, whereby the sheet tent would provide some degree of shelter and it would not be essential to use the vehicle doors as intended by the present invention.

In the use of the present invention, the vehicle door windows 4 provide light and may be adjusted for ventilation in the usual manner. Ample space area is enclosed by the erected sheet tent in addition to the usual space area of the vehicle body, whereby the latter may be suitably outfitted to provide comfortable and fully sheltered sleeping quarters for camping tourists at minimum expense and labor.

What I claim is:

In a motor vehicle body and a pair of spaced open doors at each side thereof, the combination of a rectangularly-shaped sheet tent extending across the top of the vehicle body and engaging the free edges of said open doors, a plurality of flaps carried by said sheet tent and overlapping the top edges of respective doors, a reenforcing member carried at each end of said sheet tent, a plurality of holding bars supported by and adjustably suspended against the inner face of said sheet tent, end clips carried by said holding bars and engaging the outer corners of respective doors for maintaining the latter in their relative open positions, and a rope joined with each of said reenforcing members and attached to the motor vehicle body for securing said sheet tent in position against the free edges of said open doors.

PAUL SCHNEIDER.